United States Patent [19]

Brown, Sr.

[11] 4,415,810

[45] Nov. 15, 1983

[54] DEVICE FOR IMAGING PENETRATING RADIATION

[76] Inventor: Robert L. Brown, Sr., 4805 Rutledge Dr. NW, Huntsville, Ala. 35805

[21] Appl. No.: 54,777

[22] Filed: Jul. 5, 1979

[51] Int. Cl.³ .................. H05B 33/00; G01T 1/20
[52] U.S. Cl. .................. 250/484.1; 250/367; 250/486.1
[58] Field of Search ........ 250/483, 484, 486, 213 VT, 250/485, 367

[56] References Cited

U.S. PATENT DOCUMENTS

| | | | |
|---|---|---|---|
| 3,089,956 | 5/1963 | Harper | 250/213 VT |
| 3,267,283 | 8/1966 | Kapany | 250/213 VT |
| 3,857,036 | 12/1974 | Novak | 250/485.1 |
| 4,096,381 | 6/1978 | Brown | 250/213 VT |

*Primary Examiner*—Janice A. Howell

*Attorney, Agent, or Firm*—Robert P. Gibson; Anthony T. Lane; James T. Deaton

[57] ABSTRACT

A device for imaging penetrating radiation which includes a multiplicity of contiguously disposed fiberoptic tubes each of which is made of a very small diameter with an inner core material composed of scintillating material for converting radiation to light and a cladding glass about the inner core to serve as a reflector and a third and outer layer which is light absorbing to absorb light that is being emitted at too great an angle to the optical fiber axis to be guided to an exit end of the device. Also, one end of each of the fibers has a thin layer of a corrision resistent metal or metal alloy to cause light reflected back toward this end to be directed in an opposite direction to the output end of the fiber and by this reflection cause the output to be considerably increased over that which would be lost if no reflecting means were placed at the end of each of the fibers.

7 Claims, 3 Drawing Figures

DEVICE FOR IMAGING PENETRATING RADIATION

DEDICATORY CLAUSE

The invention described herein may be manufactured, used, and licensed by or for the Government for governmental purposes without the payment to me of any royalties thereon.

CROSS-REFERENCE TO RELATED ART

This application is related to applicant's patent application Ser. No. 706,706, filed July 19, 1976 and maturing into U.S. Pat. No. 4,096,381 on Jan. 20, 1978. The system of this patent is designed to use the specific device for imaging penetrating radiation as disclosed herein.

BACKGROUND OF THE INVENTION

In readily available prior art devices, imaging of penetrating radiation (X-rays, gamma radiation, and the like) is accomplished by converting the invisible input radiation into a visible image. Earliest methods and presently used methods include photographic film and fluorescent screens. These types use a finely granular sensitive material held in an organic binder and spread in a thin, uniform coat approximately 0.005 inches thick on a light cardboard or plastic film base. This choice of coating thickness is a compromise between resolution and capture efficiency of the imaging layer for the penetrating radiation. The capture and conversion of high percentages of a penetrating radiation require very thick converting layers, but "scatter" of the image in the thicker sensing material layers results in lower resolutions. Therefore, a useful rule relating to resolution in terms of television scan lines per inch is equal to the imaging layer's thickness. As a result, image resolution in these devices is always lower than desireable. The percentage of input radiation actually captured and contributing to the image is always lower than desireable and the efficiency is usually well below 1 percent in the ranges of most imaging devices. Therefore, over 99 percent of lost input radiation penetrating the imaging layer must be compensated by increasing the input radiation levels to overcome this lack of capture efficiency. This problem has been recognized for many years and the usual approach to combat this is to accept the uniformly thin, homogenous film conversion and try to improve the light output gain by methods, devices, and systems for improving output light gain after conversion. It has been thought impossible to capture and utilize higher percentages of penetrating radiation inputs without loss of resolution beyond acceptable limits by requiring excessive thickness in the conversion layer due to "scatter". Applicant in U.S. Pat. No. 4,096,381 has pointed out a way of utilizing large thicknesses in the conversion layer and still avoid "scatter". Even in light of applicant's patent, there is a need for even greater output efficiencies than produced by the device of applicants' patent.

Therefore, it is an object of this invention to provide a device and means which incorporate elementary conversion to provide solutions to the problem of making converters for penetrating radiation so as to provide means for a pre-established, high capture efficiency and pre-establish high resolution simultaneously and independently.

A further object of this invention is to provide a device and means for utilizing the elementary conversion device in such a manner as to produce an image of output penetrating radiation, optimized for a selected capture efficiency for the input radiation to be imaged, and means by which the image converter may be optimized to produce a desired high resolution.

Still another object of this invention is to provide a scintillating device in which image resolution and converter thickness are independently selectable as required to meet capture efficiency goals.

A still further object of this invention is to provide a scintillator device which is of a construction that allows a non-homogenous optically anisotropic imaging converter to be assembled and be substantially free of internal light scattering which destroys the image resolution when thick layers of scintillator material is used as employed in many other conventional converter devices.

Yet another object of this invention is to provide a converter that utilizes a fiber optic core which is made of scintillating material that is clad with a reflecting layer and a third layer of light absorbing material and finally a mirror surface on one end of the optical fiber to reflect light toward the other end of the fiber.

Other objects and advantages of this invention will be obvious to those skilled in this art.

SUMMARY OF THE INVENTION

In accordance with this invention, a device for imaging penetrating radiation is provided which includes a fiberoptic scintillator plate that is made of a multiplicity of contiguously disposed fibers each of which includes a center core structure with material therein for converting penetrating radiation to light by capture and each fiber being cladded with a first layer which reflects light back into the core and a second layer that absorbs light that is emitted at too great an angle to the optical fiber axis to be guided to an exit end of the fiber. Also, the disk has at the front end thereof a reflective coating to reflect light from this end to the exit end of the fiber and thereby increase the light output of the device. The ends of the converter device are each cut at near a right angle to the fiber axis and polished. A disk of this type when exposed to radiation converts the radiation such as X-rays to light rays.

DESCRIPTION OF THE PREFERRED EMBODIMENTS

Figure 1:
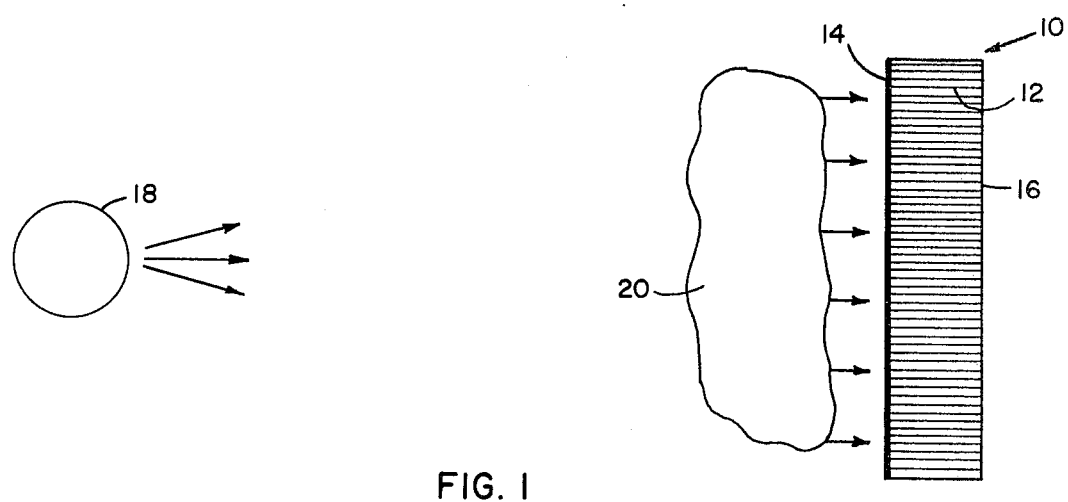
FIG. 1 is a schematic view illustrating a system with the device for imaging penetrating radiation in accordance with this invention.

Referring now to the drawing, device 10 for imaging penetrating radiation includes a multiplicity of individual fibers 12 that are pressed or otherwise secured together to form a disk or flat plate with an input metallic reflecting surface 14 and an output end or surface 16. A source of radiation 18 is utilized to irridiate subject 20 for penetrating subject 20 and for conversion to light rays by device 10 for imaging penetrating radiation received from subject 20. FIG. 2 illustrates the same system as that of FIG. 1 and the only difference in this Figure is the tapered arrangement of fibers 12 to form a tapered imaging device 10A.

Figure 3:
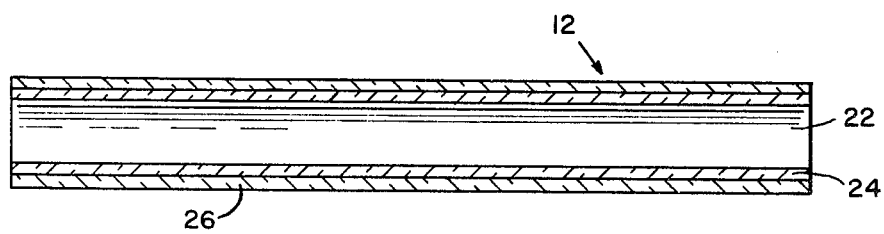
FIG. 3 is a sectional view illustrating the details of a single fiber that is used in the device for imaging penetrating radiation.

Referring now to FIG. 3, each fiber 12 is comprised of an inner core 22, an outer radial reflecting layer 24 and an outermost light asborbing layer 26. Inner core 22 is made of scintillator fiber material which is a high index of refraction substantially transparent material being of a class of scintillating, phosphorescent or fluorescent composition and which is formulated so as to convert penetrating radiation to light by capture. A typical composition suitable for this purpose is of the following weight proportions and composition of the various elements:

LiO(enriched)-6.43 g,
$SiO_2$-77.14 g,
BaO-16.43 g,
$Al_2O_3$-3.0 g, and
$CeO_2$-0.8 g.

In the above glass formulation, lithium which is activated by cesium provides the scintillations. Therefore, it is desirable to keep the lithium content as high as practicable. Glasses of this general type can be made with up to 20% lithium.

Core material 22 is surrounded by radial reflecting layer 24 which is made of an adherent transparent coating material which has a low coefficient of reflection to serve as a good reflector to keep light from escaping the core of the fiber. Standard optical fiber "cladding" glasses or even most plastics are suitable for the material in layer 24. Standard type cladding glasses such as "boron glass", "lime glass" or other standard type cladding glass compositions can be used as the cladding glass in layer 24 or such organic plastics as meet physical requirements. Outer most radial light absorbing layer 26 is required since a single capture of the scintillating fiber 22 often results in a capture of hundreds of light quanta which are emitted in a spherical pattern from the source, so that many quanta are emitted at too great an angle to the optical fiber axis to be guided to an exit end of the fiber. These quanta, if not absorbed, result in a fogging of the image that detracts from its clarity. This light absorbing layer 26 is usually a "black" or highly colored material, such as glass or plastic, which absorbs the unwanted light that can not be guided to an exit end of the fiber. The glass or plastic used in this light absorbing layer 26 has a melting point which is less than that of scintillating material 22 or layer 24 and the glass or plastic has incorporated therein a suspension of colloidal metal or metals or other colorant. Examples of such colored glass include glass colored with a suspension of colloidal metals such as copper (which gives red coloration), gold (which gives dark red coloration), iron (gives dark green color), manganese (gives deep purple coloration), black glasses of commerce which generally have colloidal suspensions of manganese, cobalt (which has an intense blue color) and, if other colors of the light absorbing layer are desired, these colors can be derived by mixing various metals and suspending them as colloidal metals in the glass, or organic dyes in plastic can be used for absorbing the unwanted or undesirable light.

The individual fibers 12 are fabricated into a disk or face plate by pressing them together in a conventional manner and as is more explicitly pointed out in Applicant's prior U.S. Pat. No. 4,096,381 which issued June 20, 1978. The ends of the converter device or device for imaging penetrating radiation are cut at a right angle or near a right angle to the fiber axis and polished. The front ends of fibers 12, when fabricated into a disk or plate as illustrated, are then coated with a metallic mirror coat made thin for low input radiation absorption, and prevents any stray light from entering the entrance end of the optic fiber which is for reflecting any radiation which has been converted to light which seeks to exit through the inlet end rather than the output end. That is, thin metallic mirror surface 14 reflects light quanta from scintillations which are 180° out of phase from the direction in which it is desired for them to travel and causes them to be reflected back to the exit end at face 16. This improves the light output of the individual fiber by about 60 to about 80% over a device that does not have the mirror reflecting means at 14. That is, a considerable improvement of light output of the fiber up to and approximate doubling of the output is made possible by using the mirror reflecting coat 14. The metallic mirror coat made thin for low absorption of input radiation can be from about 1 to about 20 millionths of an inch thick but should not be limited within these values. Also the metal or metals from which the mirror coat is made should be corrosion resistant metal or metal alloys. These metals include such metals as gold, silver, aluminum, chromium and other corrosion resistant metals or metal alloys. This mirror layer or coat with an average thickness of about 1 to about 20 millionths of an inch thick is deposited by such means as chemical or by vacuum evaporation. The metallic mirror coat needs to be as even a thickness as can be reasonably obtained. This metallic coat which forms a mirror greatly improves the output of the device for imaging penetrating radiation over a device that does not have this feature. Also, as previously noted, stray light is prevented by the metallic mirror coat from entering the input ends to fibers 12.

Figure 2:
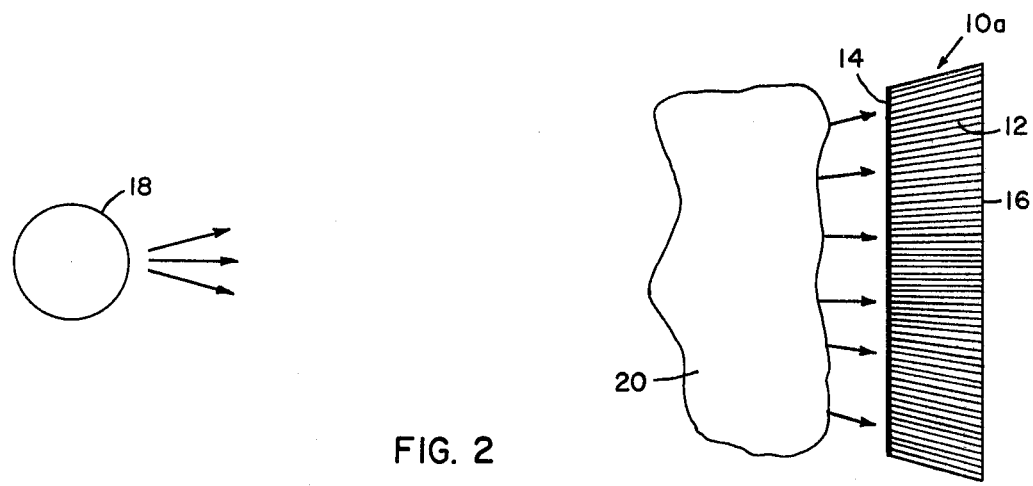
FIG. 2 is another schematic embodiment illustrating another shaped device for imaging penetrating radiation in accordance with this invention.

In use, the longitudinal axis of each fiber 12 is aligned with the incoming radiation from source 18 as illustrated in FIG. 1 or FIG. 2. As the elemental converter is a single fiber 12, it can be seen that the fiber is of a substantially uniform diameter and therefore it is apparent that this diameter is the sole factor governing the perceived diameter of scintillations at the fiber output end and the fiber diameter is therefore completely indepentent of the fiber length. It is equally apparent that the fiber length acts as a great thickness of scintillator in respect to penetrating radiation constrained to travel along the fiber core axis. Thus, the scintillating optical fiber independently allows exact determination of output diameter (scatter) of scintillations, and also allows independent selection of fiber length of optimum efficiency in capture and conversion of the particular input penetrating radiation. The input penetrating radiation can be particle radiation, such as neutrons, or radiation such as X-rays, gamma radiation, and the like in which device 10 converts the invisible input radiation into a visible image by the use of the particular scintillating material in fibers 12.

In operation, when subject 20 is subjected to penetrating radiation from source 18, those quanta of radiation traversing subject 20 penetrate mirror 14 on the entrance side of fiber optic scintillator 10 or 10A and travel through fiber course 12 until captured by the scintillating material in each fiber 12 to cause conversion of the penetrating radiation quanta into visible light quanta. This light is then emitted in a spherical radial pattern. Those quanta of light emitted in the general direction of the exit fiber axis are guided directly to the exit face 16 and exit, and those which are emitted in the nearly opposite direction are guided to the entrance end of the fiber at mirror 14 and are then reflected from mirror 14 in a complete reversal and are then guided to the exit surface or face 16 to add extra brightness to the exit image. Any light quanta emitted at too great an angle to the axis of each individual fiber 12 to be guided to exit end 16 is absorbed in the "black" layer 26 as previously pointed out in the description of FIG. 3.

The above noted sequence of events follow each conversion in whichever fiber this occurs. The result therefore is an image appearing at output surface 16 which has a resolution determined solely by the spacing of fibers 12 in the disk or array and is therefore independent of the thickness of the plate or array or disk.

By realizing that a fiber optic penetrating radiation imaging device completely divorces resolution and thickness, which separation previously has not been regarded as obtainable or possible, the instant invention recognizes and allows high resolution to be obtained in extremely thick fiber optic scintillator plates or disks which capture and image a greater percentage of input radiation than can be captured in the thin layers of photographic emulsion or phosphorus or other imaging devices which are currently in use.

This divorcement of previously thought inseparable factors is a major advantage in that the total amount of radiation input dosage as required to produce an image of an equivalent resolution by the fiber optic scintillator plate may be greatly lower than other available devices yielding equivalent resolutions. As a specific example, the conventional fluorescent screen is approximately 0.013 inch thick, and is limited by internal scattering to a resolution of 100 equivalent television lines per inch. Since the phosphor is so thin, the screen is far below 1% efficient in capturing and utilizing impinging radiation of the characteristics utilized in medicine and inspection when using X-ray radiation.

In contrast, a typical fiber optic scintillator plate as disclosed herein has the same resolution as standard fiber optic plate for transmitting light. This is in excess of 1000 equivalent television lines per inch, with the plate being of any thickness required without changing disk resolution. If made only one inch thick, the fiber optic scintillator is over 70 times as thick as the conventional fluorescent screen now in use.

By utilizing the greater thickness of the fiber scintillator plate in this invention, the scintillator plate is more efficient at capturing and imaging input X-rays than that of fluorescent screens and therefore realizes an efficiency of over 60% in utilizing typical X-ray input radiation in imaging. Thus, the fiber optic scintillating plate of this invention is more than 100 times as efficient in utilizing X-ray input as is a standard fluorescent screen, and with the added advantage of an excess of 10 times the resolution over the fluorescent screen. It is to be noted that the thickness of the scintillating fiber optic plate can be changed as desired, for greater or lesser efficiency in utilization of input radiation. This is done without influence on the resolution of the image. If a different resolution is desired, a change of fiber size will give the desired resolution without influence on the device efficiency. This independence in the vital two factors of device resolution and device efficiency in imaging is not attainable with conventional radiographic devices on the market today. This is of high importance in that the levels of harmful penetrating radiation can be greatly reduced by use of fiber optic scintillating devices as disclosed in this application.

I claim:

1. A device for imaging penetrating radiation comprising fiber optic tube means including an inner core material composed of scintillating material capable of converting radiation to light rays; a cladding transparent material, about said inner core and reflecting light back into said inner core; an outer most radial light absorbing layer that has a highly colored material suspended therein which absorbs unwanted light that cannot be guided to an exit end of said inner core material; a multiplicity of said fiber optic tube means that are made of the same materials being contiguously disposed relative to each other and secured together to define a disk with an input end face on one side of said disk and an output end face on the other side of said disk; and said input end face being a polished surface and having attached thereto a thin, corrosion resistant, metallic, mirror coat, said mirror coat being attached such as by being deposited thereon chemically or by vacuum techniques to provide a thin mirror coat of a thickness that is from about 1 to about 20 millionths of an inch thick that is opaque to stray light outside said fiber optic tube means, and that is reflective to light quanta from scintillations within said fiber optic tube means and thereby improve light output capability of each of said fiber optic tube means.

2. A device for imaging penetrating radiation as set forth in claim 1, wherein said cladding transparent material is selected from boron glass and lime glass and said highly colored material is a glass which has incorporated therein a suspension of colloidol metal or metals.

3. A device for imaging penetrating radiation as set forth in claim 2, wherein said colloidal metal or metals are selected from the group consisting of copper, gold, iron, manganese and cobalt.

4. A device for imaging penetrating radiation as set forth in claim 3, wherein said output end face is a polished surface.

5. A device for imaging penetrating radiation as set forth in claim 4, wherein said mirror coat is a metal selected from the group consisting of gold, silver, aluminum and chromium.

6. A device for imaging penetrating radiation as set forth in claim 5, wherein said fiber optic tube means of said disk are of such a size that said disk is capable of producing 1000 equivalent television lines per inch and a resolution of 10 times the size resolution of a typical fluorescent screen.

7. A device for imaging penetrating radiation as set forth in claim 1, wherein said fiber optic tube means of said disk are of such size that said disk is capable of producing 1000 equivalent television lines per inch and a resolution of 10 times the size resolution of a typical fluorescent screen.

* * * * *